United States Patent [19]
Dager et al.

[11] 3,799,657
[45] Mar. 26, 1974

[54] OPTICAL DRILLING HEAD FOR LASERS

[75] Inventors: William A. Dager; William G. Fredrick, Jr., both of Ann Arbor, Mich.

[73] Assignee: Photon Sources, Inc., Plymouth, Mass.

[22] Filed: June 5, 1972

[21] Appl. No.: 259,584

[52] U.S. Cl. .............................. 350/247, 219/121 L
[51] Int. Cl. .............................................. G02b 7/02
[58] Field of Search ....... 350/245, 247; 331/94.5 A; 219/121 L

[56] References Cited
UNITED STATES PATENTS
3,619,550  11/1971  Matthews ...................... 219/121 L
3,576,965  5/1971   Gugger ......................... 219/121 LA
3,597,578  8/1971   Sullivan ........................ 331/94.5 A
3,584,930  6/1971   Reed, Jr. ....................... 350/247

Primary Examiner—Ronald L. Wibert
Assistant Examiner—Michael J. Tokar
Attorney, Agent, or Firm—Olsen and Stephenson

[57] ABSTRACT

Apparatus for drilling holes in a circular pattern in a workpiece or coring a hole in a workpiece by directing a laser beam onto the workpiece through an optical system. The optical system has an axis of rotation concurrent with the laser beam and an optical axis offset from the axis of rotation to define a radius. When the optical system is rotated, the laser beam is directed along the optical axis and traces a circle on the workpiece having a radius corresponding to the radius between the optical axis and the axis of rotation. The radius is readily variable for various sizes of cores and hole combinations.

2 Claims, 4 Drawing Figures

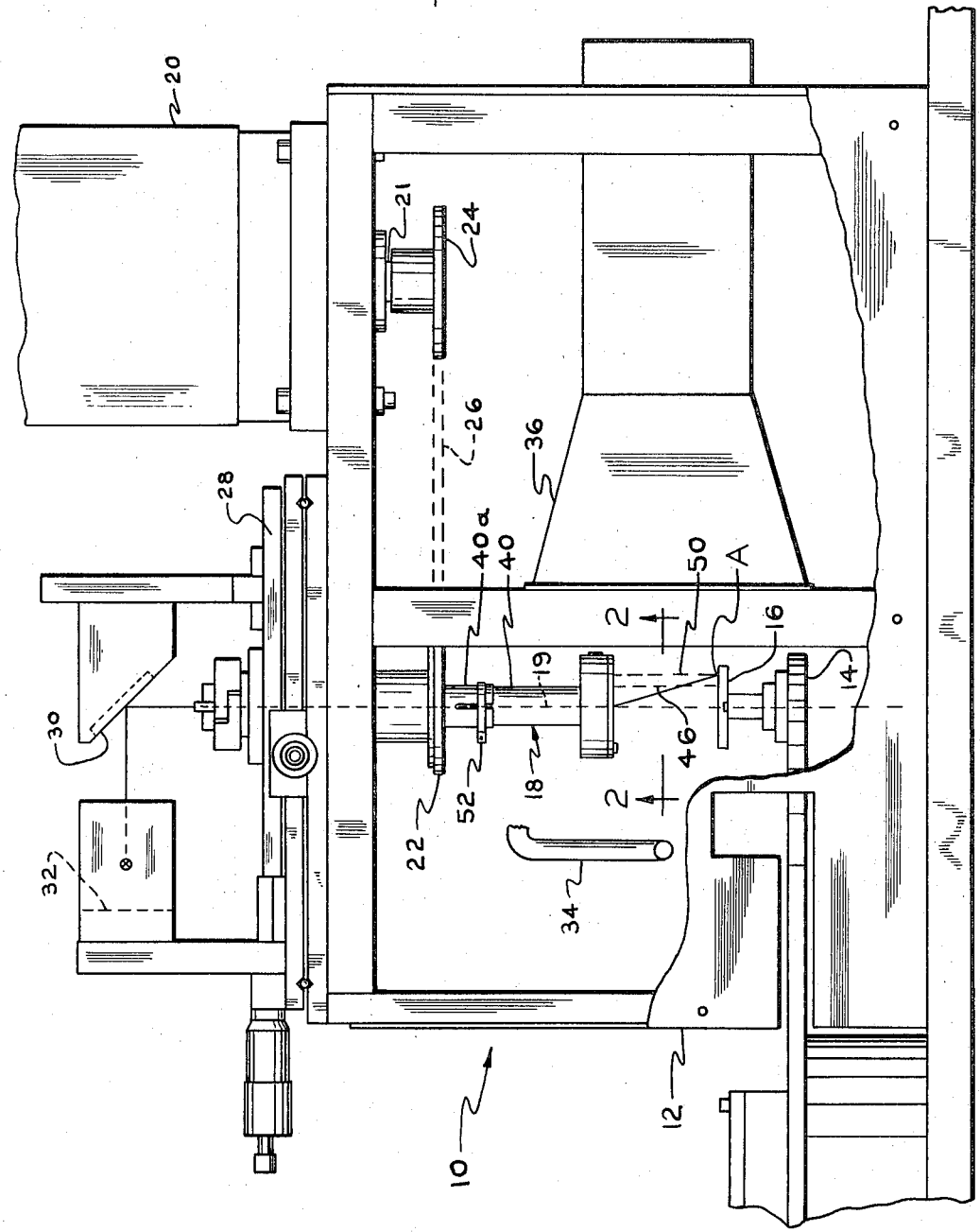

OPTICAL DRILLING HEAD FOR LASERS

BACKGROUND OF THE INVENTION

Laser beams have been employed in the past for drilling holes in a workpiece. If a hole larger than the diameter of the laser beam was desired, the workpiece would have had to be rotated about an axis offset from the beam so that a larger hole could be cored from the workpiece. Drilling smaller holes on a circumference was accomplished in much the same way. The workpiece would be rotationally indexed and the laser beam would be activated. Once the hole was drilled, the laser beam would be deactivated, the workpiece would be rotationally indexed to its next position, and the process would be repeated. The rotation and indexing of the workpiece provided severe limitations on the utility of the laser drill. The mass and moment of inertia associated with rotating a metal workpiece made rapid indexing impossible, and for workpieces that were large and cumbersome, providing a rotatable fixture at all was difficult. Rotating the laser instead of the workpiece was equally impractical due to the size and moment of inertia associated with high powered lasers.

SUMMARY OF THE INVENTION

The present invention provides a simple, precise apparatus for coring a hole in a workpiece or drilling holes in a circular pattern in a workpiece by employing an optical drill head or optical system for directing a laser beam onto a stationary workpiece. The optical drill head has a lens which has been eccentrically cut from a larger lens so that its optical axis is offset from its geometric axis. The lens is mounted within a rotary member having an axis of rotation which is concurrent with the laser beam so that the optical axis, the geometric axis, and the axis of rotation are all non-concurrent. The drilling head can be raised and lowered to focus the beam on the workpiece along the optical axis. When the rotary member is rotated, the optical axis, spaced from the axis of rotation to define a radius, causes the laser beam to trace a circumference around the axis of rotation. The radius is variable by rotating the lens around its geometric axis within the rotary member. The apparatus can be used for coring a hole in a workpiece by continuously energizing the laser beam and continuously rotating the rotary member. The apparatus can also drill holes in a circular pattern in a workpiece by step rotating the rotary member and coordinatingly pulsing the laser beam. Because the lens has been cut down to reduce its size, and because the rotary member is small and light weight, the optical drill head has a low moment of inertia about the axis of rotation of the rotary member. This low moment of inertia allows rapid rotational indexing for drilling holes on a circumference while both the laser and the workpiece remain stationary.

Further objects, features and advantages of this invention will become apparent from a consideration of the following description, the appended claims, and the accompanying drawing in which:

FIG. 1 is a side elevational view of laser drilling apparatus embodying the head of this invention;

DESCRIPTION OF THE PREFERRED EMBODIMENT

Figure 3:
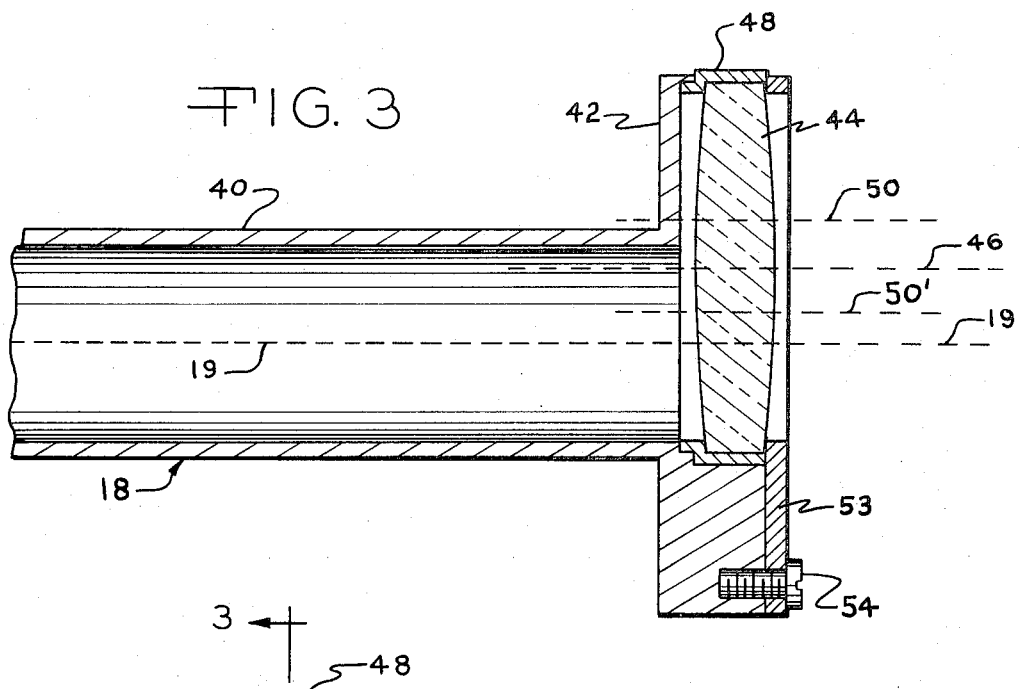
FIG. 3 is a cross sectional view of the optical drilling head as seen from the line 3—3 in FIG. 2.
Figure 2:
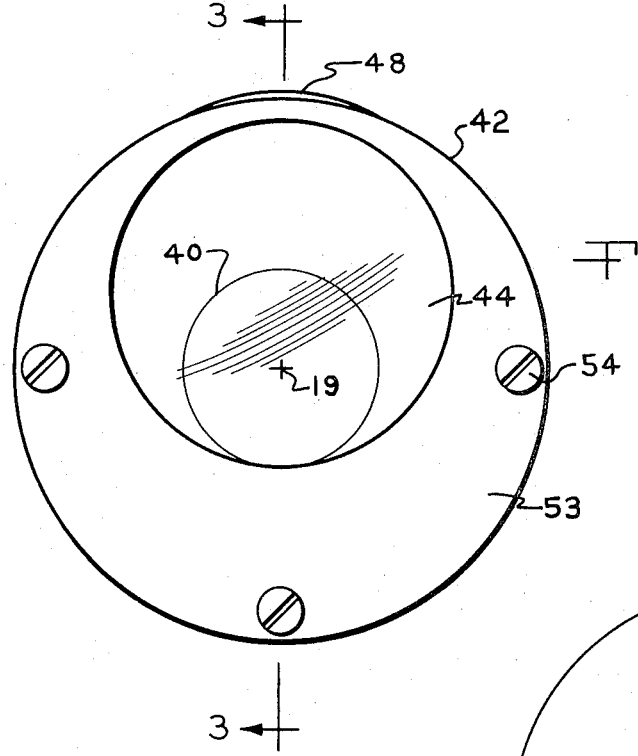
FIG. 2 is an enlarged view showing the optical drilling head of this invention as seen from the line 2—2 in FIG. 1.

Referring to the drawings, the laser apparatus 10 shown in FIG. 1 consists of a frame 12 (FIG. 1) with a fixture 14 on which a workpiece 16 can be securely attached. An optical drilling head 18 is positioned above the workpiece 16 and is rotatably mounted on the frame 12 for rotation about an axis 19. A motor 20 with a drive shaft 21 is mounted on the frame 12 and is employed to provide rotary motion to the drilling head 18 by means of a sprocket 22 attached to the drilling head 18, sprocket 24 attached to the motor's drive shaft 21, and a drive chain 26 interconnecting the sprockets 22 and 24.

A movable mirror platform 28 is mounted on the frame 12 above the drilling head 18. The platform 28 has two angularly related mirrors 30 and 32 thereon which, when aligned by moving the platform 28, direct a laser beam along the axis of rotation 19 of the drilling head 18. A laser beam source (not shown) is mounted to provide an incident laser beam at mirror 32. An air input 34 and air exhaust 36 are provided on opposite sides of head 18 to cool the drilling head 18 and keep contaminants off of the lens surface.

As shown in FIG. 3, the drilling head 18 has a tubular portion 40 which terminates at its lower end in a lens holder 42. A lens 44 (FIG. 3) is mounted in the lens holder 42. The lens 44 has been cut eccentrically from a larger lens so that it has a geometric axis 46 and an optical axis 50 which is offset from the geometric axis 46. The lens 44 may be rotated around geometric axis 46 within the lens holder 42 by means of a knurled ring 48 which supports the lens 44 and is rotatably mounted in the holder 42. A retainer plate 53, secured by screws 54 to the holder 42, maintains the ring 48 in a supported position in the holder 42. The geometric axis 46 is offset from the axis of rotation 19.

Figure 4:
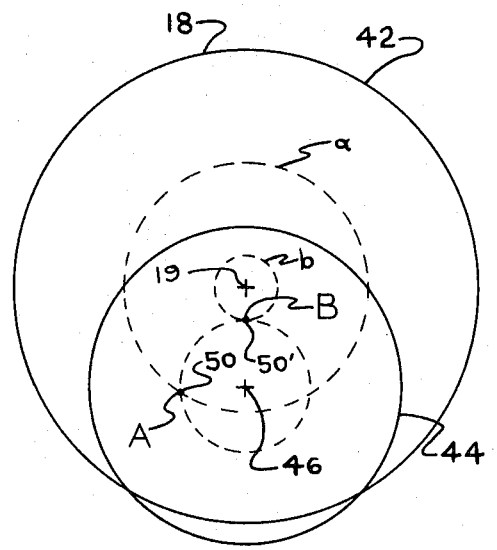
FIG. 4 is a schematic drawing of the optical drilling head showing the drilling head adjustment for various sizes of diameters.

In operation, the laser beam is aligned with the axis of rotation 19. The tubular portion 40 is then adjusted in its telescopic support 40a by means of a clamp 52 to position the lens 44 above the workpiece 16 so that the laser beam is focused on the workpiece 16 at a point A (FIG. 4) where the optical axis 50 intersects the workpiece 16. When the laser is energized and the drilling head 18 is rotated, the focused laser beam traces out a circle such as circle "a" in FIG. 4 on the workpiece 16. The focused beam in tracing the circle "a" cuts through the workpiece and cores out a hole corresponding to the circle "a." The size of the hole or circle "a" is determined by the space between the axis of rotation 19 and the optical axis 50. If the lens 44 is rotated clockwise (FIG. 4) to a position in which the optical axis is located at 50' and intersects the workpiece at a point B, a circle "b" is cored when the drilling head 18 is rotated.

If the motor 20 is stepped and the laser is correspondingly pulsed, a series of holes can be drilled along the circle "a" for example. Each resulting hole would have its center on the circle "a" and the number of holes would be determined by the number of corresponding steps of the motor 20 and pulses of the laser. The size of the holes would be determined by the size of the focused laser beam at the workpiece and the laser pulse width.

In the apparatus 10, the head 18 with the lens 44 therein functions as a rotatable optical system to direct a laser beam on the axis 19 to a desired point on the workpiece 16. An arrangement of mirrors is another optical system which could be used for this purpose.

Thus the drilling head 18 can provide for coring a hole or drilling a series of holes on a circumference with both the laser and the workpiece 16 being stationary.

The optical drilling head 18 is light in weight and enables drilling of a hole in a workpiece at an angle when desired. By virtue of the rotatable mounting of the head 18, it is readily programmable for automatic operation.

What is claimed is:

1. Apparatus for directing energy from a laser beam having an axis comprising a lens member having an optical axis and a geometric axis which is offset from said optical axis, lens holding means supporting said lens member at a position in which said optical axis and said geometric axis are located to one side of said beam axis, and means for rotating said lens holding means and said lens member about an axis of rotation substantially coincident with said beam axis.

2. Apparatus according to claim 1 wherein said lens member is rotatably mounted in said lens holding means so that said holding member is rotatable around its geometric axis in said lens holding means to adjust the spacing between said optical axis and said axis of rotation.

* * * * *